(12) United States Patent
Kwak et al.

(10) Patent No.: US 7,905,402 B2
(45) Date of Patent: Mar. 15, 2011

(54) GOODS INFORMATION PROVIDING TERMINAL AND GOODS MANAGEMENT SERVER FOR MANAGING GOODS AT HOME

(75) Inventors: Ji Young Kwak, Gwangju (KR); Ji Yong Kim, Daejeon (KR); Sung Ho Ahn, Daejeon (KR); Kyung Hee Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 379 days.

(21) Appl. No.: 11/636,191

(22) Filed: Dec. 8, 2006

(65) Prior Publication Data
US 2007/0131766 A1    Jun. 14, 2007

(30) Foreign Application Priority Data

Dec. 9, 2005  (KR) .................. 10-2005-0121037
Sep. 29, 2006  (KR) .................. 10-2006-0096626

(51) Int. Cl.
*G06F 19/00* (2006.01)
*G06Q 30/00* (2006.01)
*G06Q 90/00* (2006.01)

(52) U.S. Cl. ........ 235/385; 235/375; 235/383; 235/487; 235/492; 705/1.1; 705/28; 705/29

(58) Field of Classification Search ........... 235/375, 235/383, 385, 487, 492; 705/1.1, 28, 29
See application file for complete search history.

(56) References Cited

U.S. PATENT DOCUMENTS

| | | | | |
|---|---|---|---|---|
| 6,297,737 B1 * | 10/2001 | Irvin | ............ | 340/571 |
| 7,131,575 B1 * | 11/2006 | Kolls | ............ | 235/379 |
| 7,295,114 B1 * | 11/2007 | Drzaic et al. | ............ | 340/572.1 |
| 7,323,988 B2 * | 1/2008 | Krstulich | ............ | 340/572.1 |
| 2001/0051905 A1 * | 12/2001 | Lucas | ............ | 705/29 |
| 2003/0063003 A1 * | 4/2003 | Bero et al. | ............ | 340/573.1 |
| 2004/0100380 A1 * | 5/2004 | Lindsay et al. | ............ | 340/540 |
| 2005/0134459 A1 * | 6/2005 | Glick et al. | ............ | 340/572.1 |
| 2005/0148339 A1 * | 7/2005 | Boman et al. | ............ | 455/456.1 |
| 2005/0285739 A1 * | 12/2005 | Velhal et al. | ............ | 340/572.1 |
| 2006/0028352 A1 * | 2/2006 | McNamara et al. | ..... | 340/825.49 |
| 2007/0095907 A1 * | 5/2007 | Robinson et al. | ............ | 235/385 |

FOREIGN PATENT DOCUMENTS

| KR | 2002-0037208 | 5/2002 |
|---|---|---|
| KR | 10-2004-0076624 | 9/2004 |
| KR | 10-2005-0077657 | 8/2005 |
| KR | 10-2005-0088979 | 9/2005 |
| KR | 10-2005-0110147 | 11/2005 |

* cited by examiner

*Primary Examiner* — Michael G Lee
*Assistant Examiner* — Ali Sharifzada
(74) *Attorney, Agent, or Firm* — Blakely, Sokoloff, Taylor & Zafman LLP

(57) ABSTRACT

Provided is a goods information providing terminal that includes an authentication unit authenticating a user based on bio information including a user's fingerprint and initiating a user session when the user is authenticated; a goods information request unit requesting a goods management server that manages goods information and information on the location of goods from a radio frequency identification (RFID) attached to the goods to provide the goods information and the information on the location of the goods; a goods information display unit displaying to the user the goods information or the information on the location of the goods acquired from the goods management server; and a goods processing unit acquiring goods information including how to contact a seller from the goods management server, and contacting an associated agency including the seller when the goods need to be repaired or exchanged.

6 Claims, 6 Drawing Sheets

GOODS INFORMATION PROVIDING TERMINAL AND GOODS MANAGEMENT SERVER FOR MANAGING GOODS AT HOME

This application claims the priority of Korean Patent Application No. 10-2005-0121037, filed on Dec. 9, 2005 and Korean Patent Application No. 10-2006-0096626, filed on Sep. 29, 2006, in the Korean Intellectual Property Office, the disclosures of which are incorporated herein in their entirety by reference.

BACKGROUND OF THE INVENTION

1. Field of the Invention

The present invention relates to a goods information providing terminal and goods management server for managing goods at home, and more particularly, to a goods information providing terminal and goods management server for managing goods at home using radio frequency identification (RFID) by attaching an RFID including goods information to goods.

2. Description of the Related Art

Users can easily acquire information on goods at home from a goods management server using a goods information providing terminal. The information on goods provided by the goods information providing terminal includes information on how to use the goods, cautions, or expiry dates and information on the location of the goods. The information on the location of the goods can be used to quickly locate small portable goods. The goods information providing terminal provides a service informing a seller of goods which need to be exchanged or repaired.

An embodiment of the present invention provides the goods information providing terminal and the goods management server for easily managing goods at home. The goods information providing terminal and the goods management server form a goods management system.

Research into ubiquitous networking and computing has been actively carried out in recent times. In particular, research is being carried out on technology for automatically recognizing the movement of objects and locating objects in a wireless environment and development of systems using the technology.

A ubiquitous environment provides users with a computing service regardless of time and place. Technology for linking a virtual world and the real world is required to realize the ubiquitous environment.

Automatic recognition technology is required to link the virtual world and the real world. Examples of automatic recognition technology are barcode systems, optical character recognition systems, smart card systems, and RFID systems.

An RFID system that attaches an RFID to objects, provides information on objects, and detects surroundings is one of a variety of technologies that will lead a future IT market. RFID automatically recognizes data stored in tags, labels, cards, etc. including microchips using a reader and a radio frequency.

RFID is indispensable to the ubiquitous environment since its performance in terms of chip storing and recognition is improved. RFID overcomes defects of barcodes or magnetic recognition apparatuses and provides convenience to users. Therefore, RFID is considered as the next core technology in the logistics management field or inventory management field.

There are many goods such as various electric and electronic appliances such as televisions, audio devices, videos, PCs, etc., living supplies, clothes, shoes, food, medicine, etc. at home.

Goods at home provide information in the form of a text, such as a product introduction or a product advertisement necessary for explaining how to purchase the products and information on how to use the products, cautions, or expiry dates.

Text information on products causes data loss due to a user's carelessness.

SUMMARY OF THE INVENTION

The present invention provides a goods information providing terminal and a goods management server for easily managing goods at home by applying a radio frequency identification (RFID) system to the field of home living.

According to an aspect of the present invention, there is provided a goods information providing terminal comprising: an authentication unit authenticating a user based on bio information including a user's fingerprint and initiating a user session when the user is authenticated; a goods information request unit requesting a goods management server that manages goods information and information on the location of goods from an RFID (radio frequency identification) attached to the goods in order to provide the goods information and the information on the location of the goods; a goods information display unit displaying to the user the goods information or the information on the location of the goods acquired from the goods management server; and a goods processing unit acquiring goods information including how to contact a seller from the goods management server, and contacting an associated agency including the seller when the goods need to be repaired or exchanged.

According to another aspect of the present invention, there is provided a goods management server comprising: a goods information acquiring unit periodically acquiring goods information from RFIDs attached to goods; a location information acquiring unit mapping the location of the goods and a map of a space in which the goods exist based on information on the distance of the goods acquired from the strength of a signal between RFIDs or a signal transfer delay; a goods information management unit storing the goods information and the information on the location of the goods and periodically updating the goods information and the information on the location of the goods; and a goods information providing unit providing the goods information providing terminal that provides the user with the goods information with the goods information or the information on the location of the goods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings.

Figure 1:
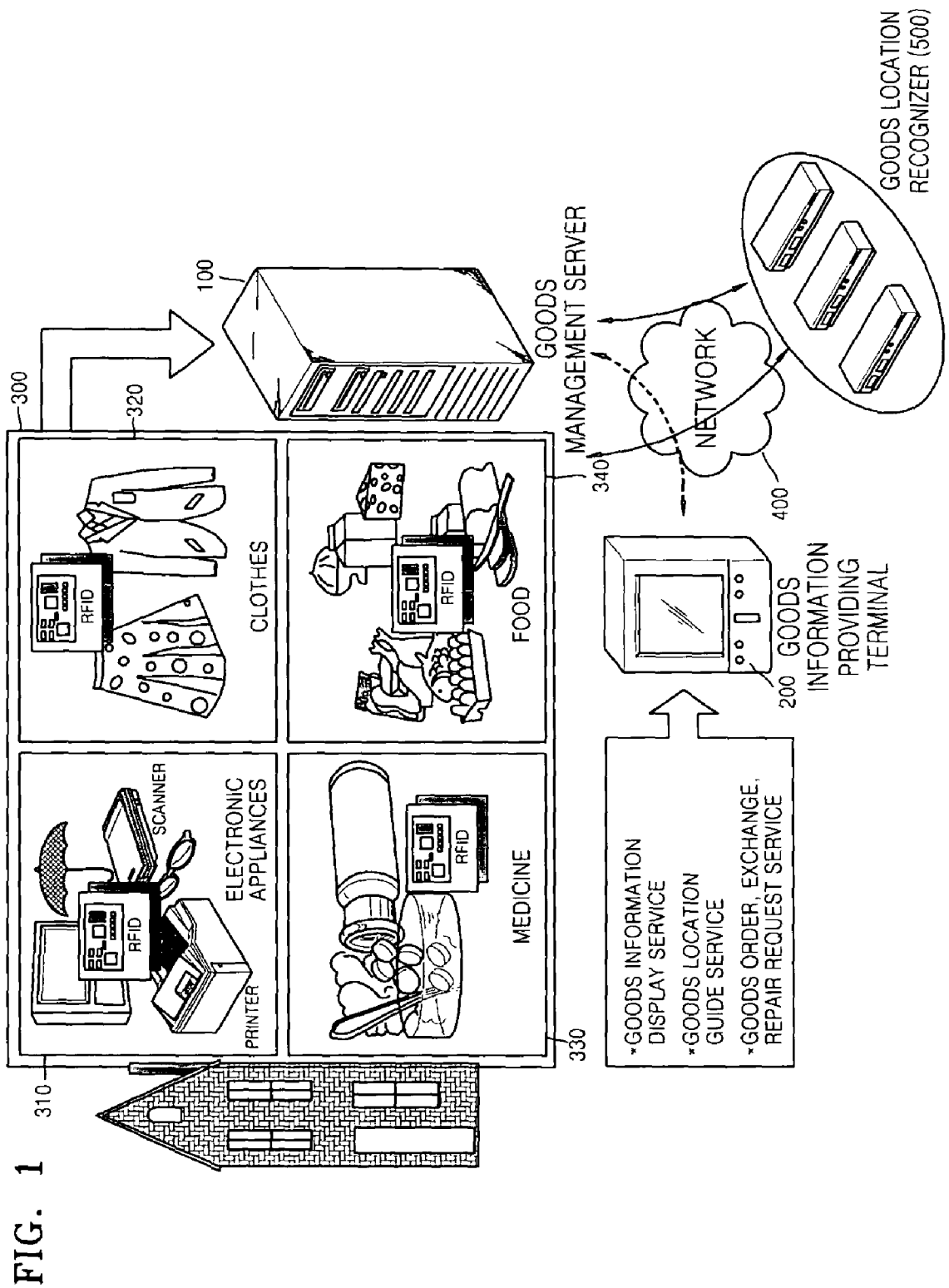
FIG. 1 illustrates a goods management system comprising a goods information providing terminal and a goods management server according to an embodiment of the present invention.

FIG. 1 illustrates a goods management system comprising a goods information providing terminal 200 and a goods management server 100 according to an embodiment of the present invention.

Referring to FIG. 1, the goods management system comprises the goods management server 100, the goods information providing terminal 200, goods at home to which a radio frequency identification (RFID) is attached 300, a network 400, and goods location recognizers 500.

The RFID stores goods information that has been provided in the form of a text on paper or fabric medium in audio or graphic form. The goods management system of an embodiment of the present invention attaches the RFID to the goods at home and provides a user with information on the goods at home.

The RFID stores a greater amount of goods information than paper or fabric, by using a small semiconductor chip. Goods information provided in the form of text on the paper or fabric is recorded in the RFID in audio or graphic form. The RFID is attached to the goods at home.

The RFID reduces loss of goods information, avoids limits in the amount of information, and provides information on the goods location. Goods information stored in the RFID includes conventional basic goods information and additional goods information on the goods.

The additional goods information depends on the features of each type of goods.

Examples of additional goods information recorded in the RFID will now be described with reference to FIG. 2. Examples of the goods at home to which the RFID is attached 300 are electronic appliances 310, clothes 320, medicine 330, and food 340.

In order to use the goods information stored in the RFID using the goods management system of the present embodiment, the goods management server 100 acquires two dimensional information on the location of goods based on the goods information and use information recorded in the RFID attached to the goods, builds a database including the two dimensional information on the location of the goods, and periodically updates the database.

Each of the goods location recognizers 500 acquires information on the distance of the goods to which the RFID is attached based on the strength of a signal between RFIDs or a signal transfer delay, and transmits the information on the distance of the goods to the goods management server 100.

The goods management server 100 acquires the goods information from the RFID attached to the goods, and acquires information on the location of the goods in a space based on two or more pieces of the information on the distance of the goods from each of the goods location recognizers 500. The goods management server 100 stores the goods information and the information on the location of goods in the database and periodically updates the stored information.

If the user requests information on goods, the goods information providing terminal 200 acquires the goods information or information on the location of the goods desired by the user from the goods management server 100, and displays the acquired information to the user in the graphic or audio form.

The goods management server 100, the goods information providing terminal 200, and the goods location recognizers 500 connect to one another through the network 400. If the user requests the information on goods, the network 400 is used to communicate necessary data, and to provide the information on the distance of the goods measured by each of the goods location recognizers 500 at a present reference point to the goods management server 100 by means of a network protocol.

FIGS. 2A through 2D illustrate detailed information on goods at home and goods management services arranged according to different categories according to an embodiment of the present invention. Referring to 2A through 2D, the goods at home to which RFIDs are attached include electronic appliances, clothes, medicine, and food.

The goods at home include various electric and electronic appliances such as televisions, audio devices, videos, PCs, etc., living supplies, clothes, shoes, food providing life energy, medicine, etc. Useful information on the goods at home is provided to a user through the goods management system of an embodiment of the present invention regardless of time and place.

Figure 2A:
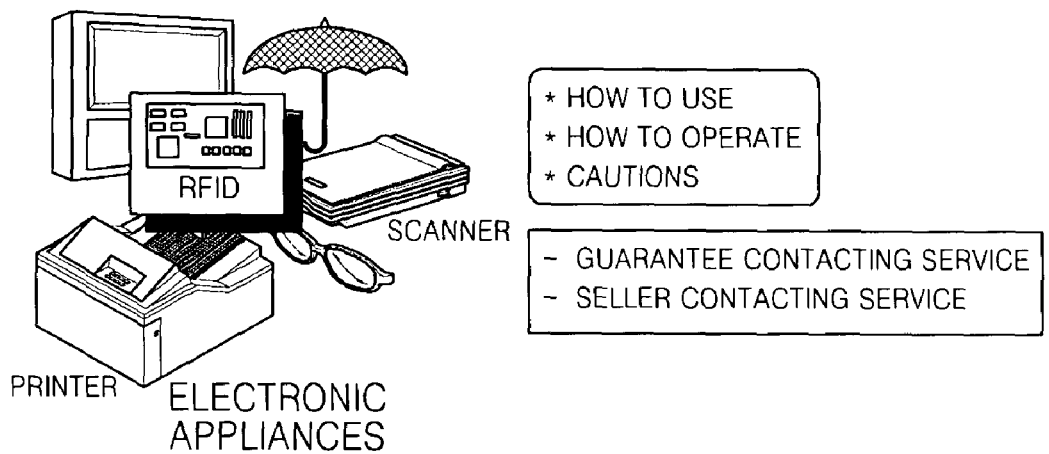
FIGS. 2A through 2D illustrate detailed information on goods at home and goods management services arranged according to different categories according to an embodiment of the present invention.

FIG. 2A illustrates electronic goods information stored in an RFID attached to electronic appliances and an electronic appliances management service according to an embodiment of the present invention. The goods information stored in the RFID includes information on how to use and operate the electronic appliances and cautions, and is provided to the user when the occasion demands.

The electronic appliances management services include a guarantee service for goods that need to be exchanged or repaired and a service of contacting a seller. Therefore, the user can easily manage electronic appliances using the goods management system of the present embodiment.

Figure 2B:

FIG. 2B illustrates clothes information stored in the RFID attached to clothes and a clothes management service according to an embodiment of the present invention. The goods information stored in the RFID attached to the clothes includes information on how to do washing, fashion accessories and washing cautions, and information on how to coordinate clothes and fashion accessories.

The clothes management services include a service of contacting a seller of purchased goods that need to be exchanged and refunded, and a service of contacting a repairer and a laundry.

Figure 2C:
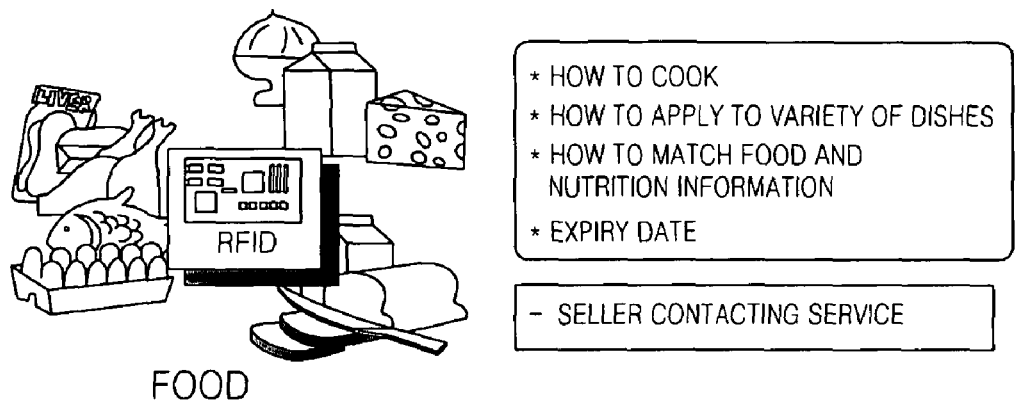

FIG. 2C illustrates food information stored in the RFID attached to food and a food management service according to an embodiment of the present invention. The food information stored in the RFID attached to the food includes information on how to cook the food, with what to match the food, and nutrition, and expiry dates, etc. The user can serve a family with delicious dishes using the food information, and can easily manage food.

The food management service includes an additional order service using a service of contacting a shopping center selling food.

Figure 2D:
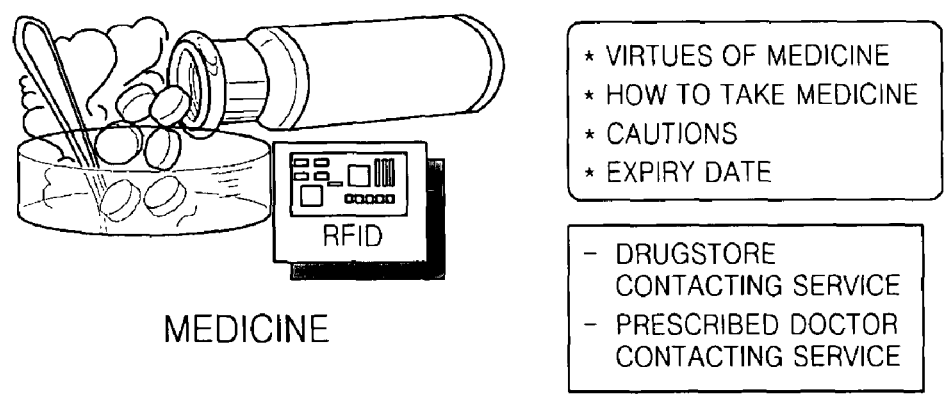

FIG. 2D illustrates medical information stored in the RFID attached to medicine and a medicine management service according to an embodiment of the present invention. The medical information stored in the RFID attached to the medicine includes information on the virtues of the prescribed medicine, how to take the medicine, cautions, and expiry dates.

The medicine management service includes a service of contacting a drug store or a doctor who wrote a prescription when the user has a question regarding the medicine or needs counseling. The existing goods information is often not sufficient to use goods purchased by a user. Therefore, the RFID attached to the goods further stores information on methods of using goods in addition to the existing basic information. For example, if the RFID stores the information on how to coordinate clothes and fashion accessories in addition to the basic information on how to wash the clothes and fashion accessories, a purchaser can use the clothes and fashion accessories to their full advantage. Also, if the RFID further stores the information on how to match food, how to cook food, and how to modify the cooking, a homemaker can cook food more easily.

Various pieces of goods information are acquired from the RFID attached to goods so as to build the database in the goods management server 100. The goods information providing terminal 200 requests the goods information from the goods management server 100 according to a user's request and informs the user of the goods information in audio and graphic form.

Figure 3:
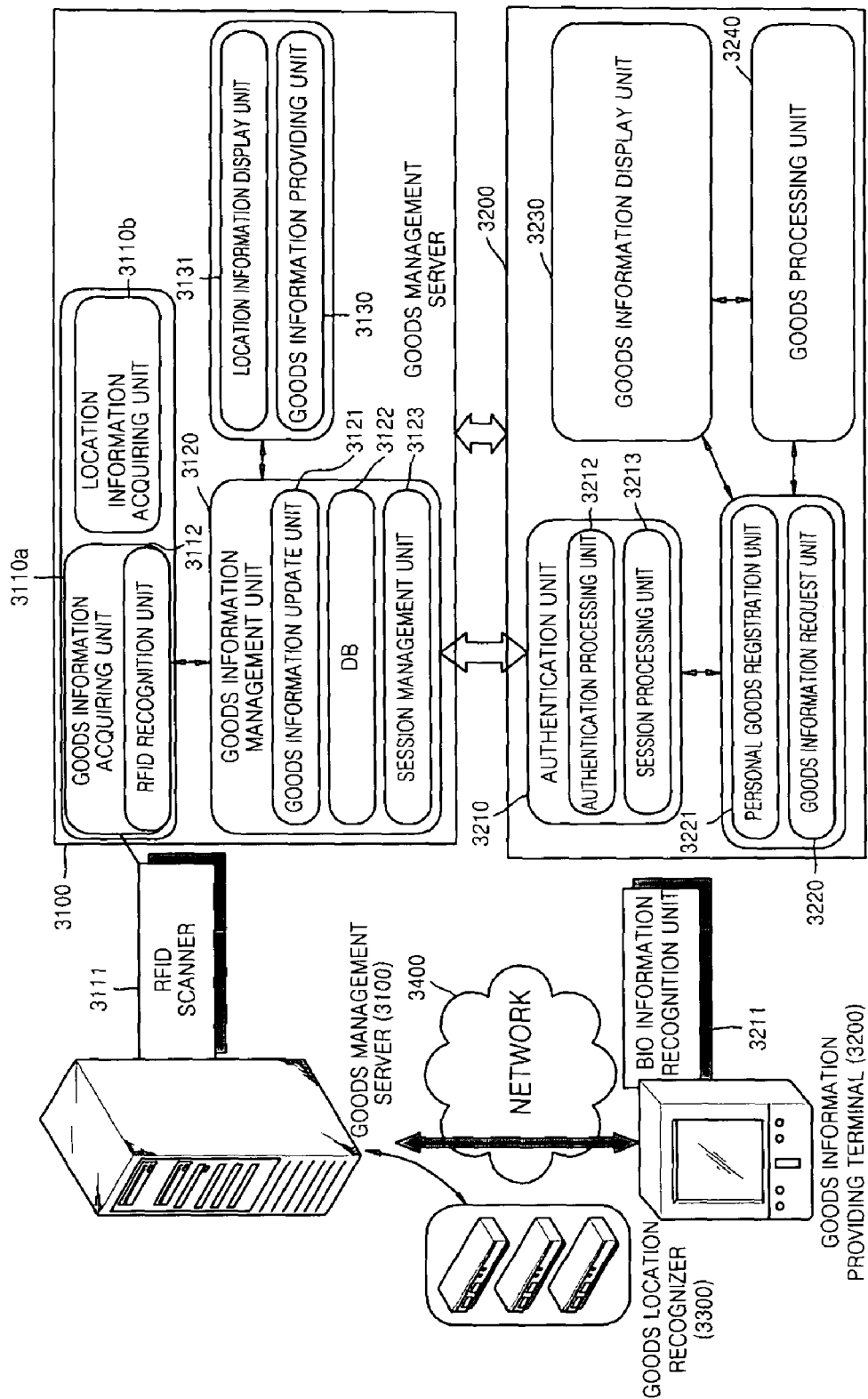
FIG. 3 illustrates a goods management system according to an embodiment of the present invention.

FIG. 3 illustrates a goods management system according to an embodiment of the present invention. Referring to FIG. 3, the goods management system comprises a goods management server 3100, a goods information providing terminal 3200, and a goods location recognizer 3300.

The goods management server 3100 manages a database containing information data of goods at home, and updates the database.

The goods information providing terminal 3200 requests the goods management server 3100 for goods information that a user wants, and displays the goods information to the user.

The goods location recognizer 3300 measures information on the distance of goods at home from a current reference point using the strength of an RF signal received from an RFID attached to the goods and a transfer delay of the RF signal to acquire the information on the distance of the goods. The information on the distance of the goods measured by the goods location recognizer 3300 from the current reference point is used as basic data for estimating two dimensional information on the location of the goods at home.

The goods management system is configured by connecting the goods management server 3100, the goods information providing terminal 3200, and the goods location recognizer 3300 together via a network 3400. The goods management server 3100 comprises a goods information acquiring unit 3110a, a location information acquiring unit 3110b, a goods information management unit 3120, and a goods information providing unit 3130.

The goods management server 3100 comprises an RFID scanner 3111 and an RFID recognizing unit 3112 for acquiring the goods information from the RFID attached to the goods at home.

The goods management server 3100 periodically acquires the goods information including the information on the distance of the goods attached to the RFID from the goods location recognizer 3300 using the location information acquiring unit 3110b in order to measure the two dimensional information on the location of the goods based on two or more pieces of information on the distance of the goods. For example, the goods management server 3100 receives reference points and the information on the distance of the goods, and acquires the two dimensional information on the distance of the goods at home based on the goods distance data from several reference points.

The goods location recognizer 3300 measures the information on the distance of the goods at home using the strength of the RF signal received from the RFID attached to the goods and the transfer delay of the RF signal to acquire the information on the distance of the goods.

The location information acquiring unit 3110b periodically acquires the goods information including the information on the distance of the goods to which the RFID is attached from the goods location recognizer 3300, and acquires the two dimensional location information on the goods at home based on the information on the distance of the goods from each reference point.

The goods information acquiring unit 3110a includes the RFID scanner 3111 and the RFID recognizing unit 3112.

The RFID scanner 3111 acquires the goods information from RFID tags attached to the goods. The RFID recognizing unit 3112 receives the acquired goods information and transfers the goods information to the goods information management unit 3120.

The goods information management unit 3120 stores the goods information and user information input by the user, and periodically updates the goods information and the user information. The goods information management unit 3120 includes a goods information update unit 3121, database 3122, and a session management unit 3123. The goods information update unit 3121 periodically updates a database 3122 with the goods information and the information on the location of the goods acquired from the RFID.

The session management unit 3123 authenticates the user based on the user information stored in the database 3122 and initiates a user session for the authenticated user.

When the user requests the goods information, the goods information providing unit 3130 acquires the goods information from the goods information management unit 3120.

When the user requests the information on the location of the goods, the location information display unit 3131 acquires the information on the location of the goods from the goods information management unit 3120, converts the information on the location of the goods that is in the form of text into visual information on the location of the goods, and provides the visual information on the location of the goods to the goods information display unit 3230.

The goods information providing terminal 3200 includes an authentication unit 3210, a goods information request unit 3220, the goods information display unit 3230, and a goods processing unit 3240.

The authentication unit 3210 includes of the bio information recognition unit 3211, an authentication processing unit 3212, and a session processing unit 3213.

The user is authorized by recognizing bio information, such as a user's fingerprint, by means of the bio information recognition unit 3211 in order to access information stored in the database 3122 of the goods management server 3100.

The user is authorized by inputting a text password to the authentication processing unit 3212. If the user is blind or cannot input the text password, the user can be authorized by voice recognition by using a voice recognition module.

It is determined whether to authorize the user based on information provided by the session management unit 3123 of the goods management server 3100 that manages user information. The session processing unit 3123 initiates a user session when the user is completely authorized.

In detail, the authentication unit 3210 authorizes the user based on the user information and bio information on the user, and initiates a session of the authorized user.

The goods information request unit 3220 receives a user's request to provide the goods information, and requests the goods information providing unit 3130 to provide the goods information requested by the user.

A personal goods registration unit 3221 registers specific goods as user's personal goods in the goods information management unit 3120, which prevents another user being informed about the goods information and location information.

The user requests the goods information providing unit 3130 of the goods management sever 3100 to provide the goods information requested by the goods information request unit 3220.

The goods information display unit 3230 outputs the goods information requested by the user in audio and graphic form using a voice combination module and an audio and graphic device to display the goods information to the user.

If the user requests the information on the location of goods, the location information display unit 3131 of the goods management server 3100 converts the location information in the form of text into visual location information on a screen displaying the interior of a house, and provides the user with the visual location information in audio and graphic form.

The goods information display unit 3230 displays the goods information acquired from the goods information providing unit 3130. The goods information display unit 3230 displays information on the goods that are registered as personal goods to a registered user.

The user who basically is a member of a family can be informed of information on every goods at home. However, specific goods are registered as personal goods according to a user's will to prevent information on the registered personal goods from being informed of another user in order to protect a user's private life. In detail, since goods that are registered as personal goods are informed of the registered user, another user cannot be informed of whether the goods exist.

The goods information display unit 3230 displays to the user the goods information in at least one of a text, voice, and graphic form.

When goods at home need to be repaired or exchanged, the goods processing unit 3240 acquires goods information including a contact number of a seller from the goods information providing unit 3130, and connects the seller.

If it is necessary to repair or exchange living supplies or purchase new ones to replace those that are out of order, the goods processing unit 3240 easily handles the living supplies by requesting information data such as a seller or a guarantee service center, and information data on how to contact the seller or the guarantee service center stored in the database 3122 of the goods management server 3100.

Figure 4:
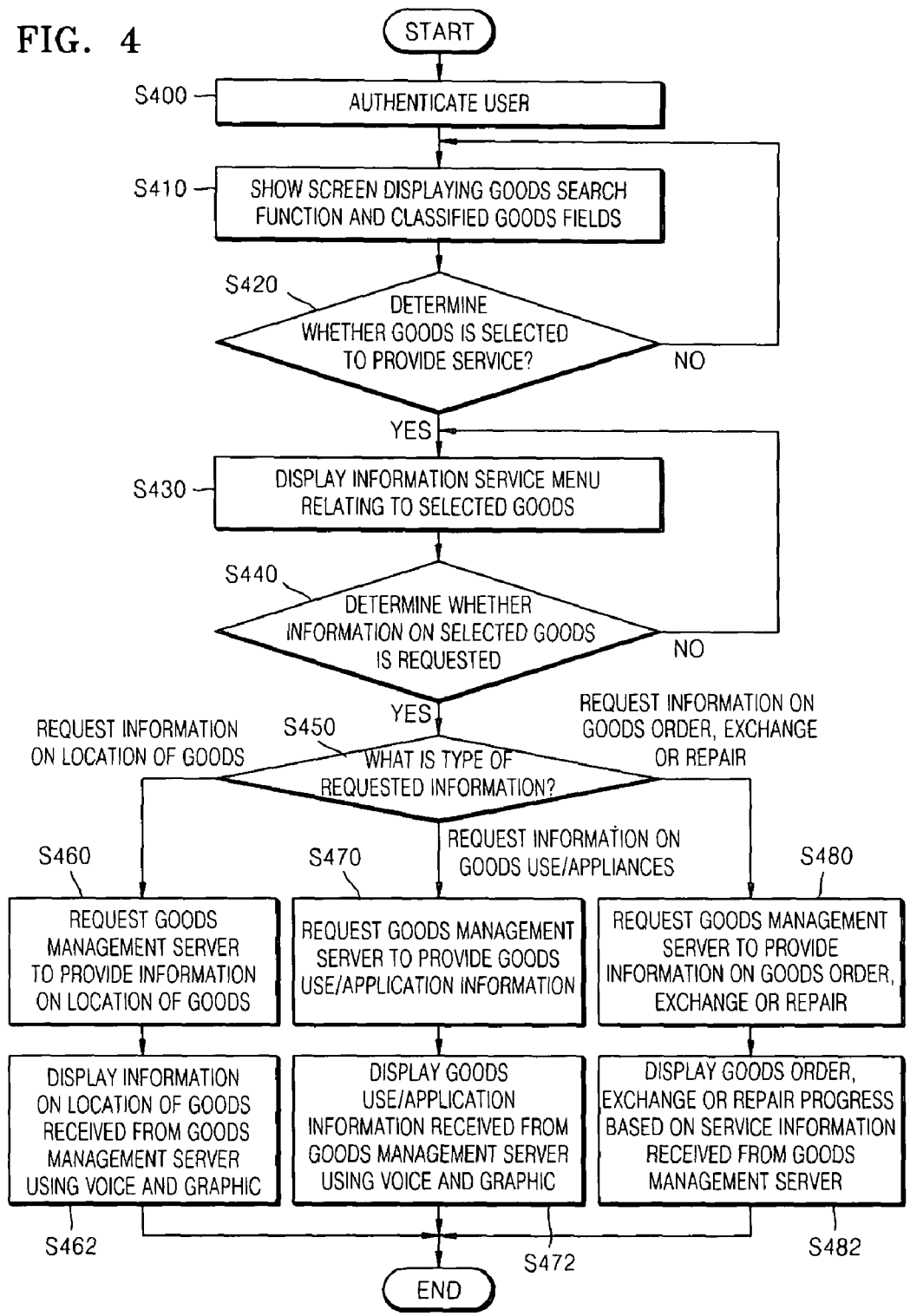
FIG. 4 is a flowchart illustrating a process of providing a user with goods information, information on the location of goods, and a service connecting a request for the exchange or repair of goods according to an embodiment of the present invention.

FIG. 4 is a flowchart illustrating a process of providing a user with goods information, information on the location of goods, and a service connecting a request for the exchange or repair of goods according to an embodiment of the present invention. Referring to FIG. 4, at first, the user is authorized (Operation 400). A goods information providing terminal includes a screen displaying a goods search function and classified goods fields (Operation 410) so that information on goods at home can be provided to the authorized user.

If the user selects desired goods from the screen, an information service menu relating to the selected goods is displayed (Operation 430). The goods information providing terminal provides a goods information display service, a goods location guide service or a service of contacting an associated agency, etc.

The goods information display service receives goods information requested by the user from the goods management server, and displays the goods information in audio and graphic form. The goods location guide service provides information on the location of specific goods at home. The service of contacting the associated agency connects to a seller or a guarantee center in order to exchange or repair goods which are out of order.

If the user selects the goods information display service, a goods management server that manages a database of goods information is requested to provide goods information according to a user's request (Operation 470).

The goods information received from the goods management server is provided in audio and graphic form, according to a user's taste, by the goods information providing terminal (Operation 472).

If the user selects the goods location guide service, the goods management server is requested to provide information on the location of the selected goods (Operation 460). The information on the location of the selected goods is provided to the user via a guide voice and a goods location screen by the goods information providing terminal (Operation 462).

Some of goods are stationary at home, whereas other goods such as a remote controller or a wireless telephone are small and portable. It is difficult to locate small goods as they are frequently moved.

The user requests the goods location guide service by using the goods information providing terminal in order to quickly locate the small goods that are frequently moved. The goods information providing terminal requests the goods management server to provide information on the location of the goods.

The goods information providing terminal displays the information on the location of the goods to the user via a guide voice and a goods location screen.

When it is necessary to repair or exchange purchased goods or purchase new ones to replace those, the goods management server is requested to provide information on the associated agency (Operation 480).

A service contacting the associated agency is provided using a contact number of a seller or a guarantee center or information on how to connect to the associated agency acquired from the information on the associated agency, and a service progress is displayed (Operation 482).

If it is necessary to repair or exchange living supplies or purchase new ones to replace those that are out of order, the service of contacting the associated agency is provided by acquiring a contact number of a seller or a guarantee service center, and information on how to contact the seller or the guarantee service center from information stored in the RFID attached to the goods. When the user has a question regarding purchased medicine or needs counseling, a service of contacting a drug store or a doctor who wrote a prescription is provided.

Figure 5:
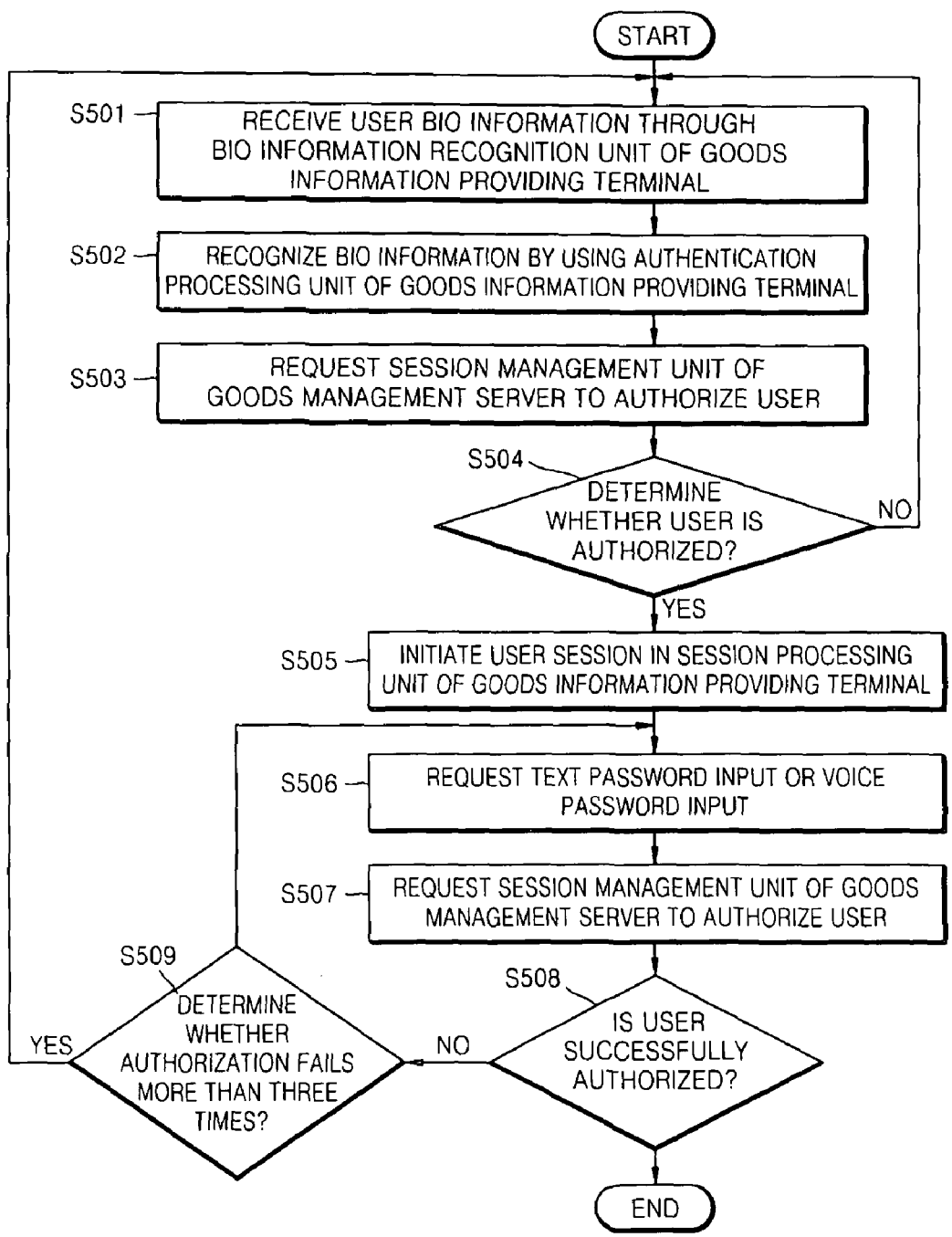
FIG. 5 is a flowchart illustrating a user authentication process according to an embodiment of the present invention.

FIG. 5 is a flowchart illustrating a user authentication process according to an embodiment of the present invention. Referring to FIG. 5, the user authentication process includes two operations in order to authorize a user who can use a goods information providing terminal.

The first operation comprises authenticating the user of a goods management system by means of a bio information recognition unit attached to the goods information providing terminal. The second operation comprises inputting a password so as to ensure security.

It is determined whether to authorize the user to use the goods information providing terminal by means of the bio information recognition unit attached to the goods information providing terminal (Operations 501 through 503).

The authorized user inputs the password so as to ensure security (Operations 505 through 507). If the user is blind or cannot input the password, the user voice recognition is used.

The user authentication process using the bio information recognition unit is as follows. Bio information is received by using the bio information recognition unit of the goods information providing terminal (Operation 501). The bio information is recognized by an authentication processing unit of the goods information providing terminal (Operation 502).

A session management unit of the goods management server is requested to authorize the user (Operation 503). It is determined whether the user is authorized (Operation 504) and if the user is authorized, the session processing unit of the goods information providing terminal initiates a user session (Operation 505).

A user authentication process using an input of a text password is as follows. The user is requested to input the text password or input a password by using voice recognition (Operation 506). The session management unit of the goods management server is requested to authorize the user (Operation 507).

The authorized user who is authorized to use the goods information providing terminal through the two authentication operations can be provided with information on goods at home in audio and graphic form.

The goods information providing terminal provides a goods information display service, a goods location guide service or a service of contacting an associated agency.

If the user authorization fails more than three times (Operations 508 and 509), Operations 501 through 507 are performed.

The goods information display service receives goods information requested by the user from the goods management server and displays the goods information in audio and graphic form. The goods location guide service provides information on the location of specific goods at home. The service of contacting the associated agency contacts a seller or a guarantee center in order to exchange or repair goods that are out of order.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves. The computer readable recording medium can also be distributed network coupled computer systems so that the computer readable code is stored and executed in a distributed fashion.

A user can easily acquire information on goods at home by means of a goods information providing terminal and a goods management server of the present invention. It is possible to easily locate small goods that are frequently moved. It is possible to easily contact an associated service center when goods are out of order. The present invention provides the user with the ability to easily manage goods at home.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A goods management server comprising:
a goods information acquiring unit periodically acquiring goods information from RFIDs attached to goods;
a location information acquiring unit mapping the location of the goods and a map of a space in which the goods exist based on information on the distance of the goods acquired from the strength of a signal between RFIDs or a signal transfer delay;
a goods information management unit storing the goods information and the information on the location of the goods and periodically updating the goods information and the information on the location of the goods;
a goods information request unit that manages goods information and information on the location of goods from the RFID attached to the goods in order to provide the goods information and the information on the location of the goods, wherein the goods information request unit comprises: a personal goods registration unit registering specific goods as a user's personal goods;
a goods information providing unit coupled to the goods information management unit and a goods information providing terminal, the goods information providing terminal to display a goods search function on a screen from which a specific user among of users selects desired goods and the user's personal goods among the selected desired goods, the goods information providing terminal further to display an information service menu relating to selected goods in response to the specific user's selection, wherein the information service menu provides the information on the location of the selected goods, how to use the selected goods, and information on order, exchange or repair of the selected goods, wherein said information relating to the specific user's personal goods is available only to the specific user among the plurality of users; and
a goods information display unit outputting, in audio and graphics forms, information of the selected goods in response to a request from the user.

2. The goods management server of claim 1, wherein the goods information acquiring unit comprises:
an RFID scanner acquiring the goods information from the RFIDs attached to the goods using an RF signal; and
an RFID recognition unit receiving the goods information and transferring the goods information to the goods information management unit.

3. The goods management server of claim 1, wherein the location information acquiring unit acquires the information on the location of the goods using the information on the location of the goods measured by a goods location recognizer based on the strength of the signal between RFIDs or the signal transfer delay.

4. The goods management server of claim 1, wherein the goods information management unit comprises:
a goods information update unit periodically updating the goods information and the information on the location of the goods in a database; and
a session management unit authenticating the user and initiating a user session when the user is authenticated.

5. The goods management server of claim 1, wherein the goods information providing unit comprises: a location information display unit providing the information on the location of the goods on the goods information display unit in two dimensional graphic form when the user requests that information on the location of the goods be provided.

6. The goods management server of claim 1, wherein the goods information providing unit sends goods information including how to contact a seller to the goods information providing terminal when the goods need to be repaired or exchanged.

* * * * *